US005774664A

United States Patent [19]

Hidary et al.

[11] Patent Number: 5,774,664

[45] Date of Patent: Jun. 30, 1998

[54] ENHANCED VIDEO PROGRAMMING SYSTEM AND METHOD FOR INCORPORATING AND DISPLAYING RETRIEVED INTEGRATED INTERNET INFORMATION SEGMENTS

[75] Inventors: Jack D. Hidary, New York; Craig Ullman, Brooklyn; Nova T. Spivack, New York, all of N.Y.

[73] Assignee: ACTV, Inc., New York, N.Y.

[21] Appl. No.: 622,474

[22] Filed: Mar. 25, 1996

Related U.S. Application Data

[63] Continuation-in-part of Ser. No. 615,143, Mar. 14, 1996, which is a continuation-in-part of Ser. No. 613,144, Mar. 8, 1996, abandoned.

[51] Int. Cl.[6] .............................. G06F 13/00; H04N 5/50
[52] U.S. Cl. ........................ 395/200.48; 348/12
[58] Field of Search ........................... 395/200.3, 200.48, 395/200.47, 327, 200.49; 348/7, 8, 10, 12, 13, 461, 564, 906; 455/3.1, 5.1, 6.1, 6.3

[56] References Cited

U.S. PATENT DOCUMENTS

| | | | |
|---|---|---|---|
| 5,014,125 | 5/1991 | Pocock et al. | 348/7 |
| 5,481,542 | 1/1996 | Logston et al. | 348/7 |
| 5,534,913 | 7/1996 | Majeti et al. | 348/7 |
| 5,572,442 | 11/1996 | Schulhof et al. | 364/514 C |
| 5,589,892 | 12/1996 | Knee et al. | 348/731 |
| 5,612,730 | 3/1997 | Lewis | 348/8 |

*Primary Examiner*—Parshotam S. Lall
*Assistant Examiner*—Viet Vu
*Attorney, Agent, or Firm*—Dorsey & Whitney LLP

[57] ABSTRACT

A system for integrating video programming with the vast information resources of the Internet. A computer-based system receives a video program and uniform resource locators (URLs). The URLs, the effective addresses of locations or Web sites on the Internet, are interpreted by the system and direct the system to the Web site locations to retrieve related Web pages. Web pages related to the video programming appear upon receipt through the user's browser. The video program signal can be displayed on a video window on a conventional personal computer screen. The actual retrieved Web pages can be time stamped to also be displayed, on another portion of the display screen, when predetermined related video content is displayed in the video window. The computer-based system can receive the URLs embedded in the video program or directly through an Internet connection, at times specified by TV broadcasters in advance. The system interprets the URLs and retrieves the appropriate Web pages. The Web pages are synchonized to the video content for display in conjunction with a television program being broadcast to the user at that time. This system allows the URLs to be entered for live transmission to the user.

3 Claims, 3 Drawing Sheets

SYSTEM DESIGN

SOFTWARE DESIGN

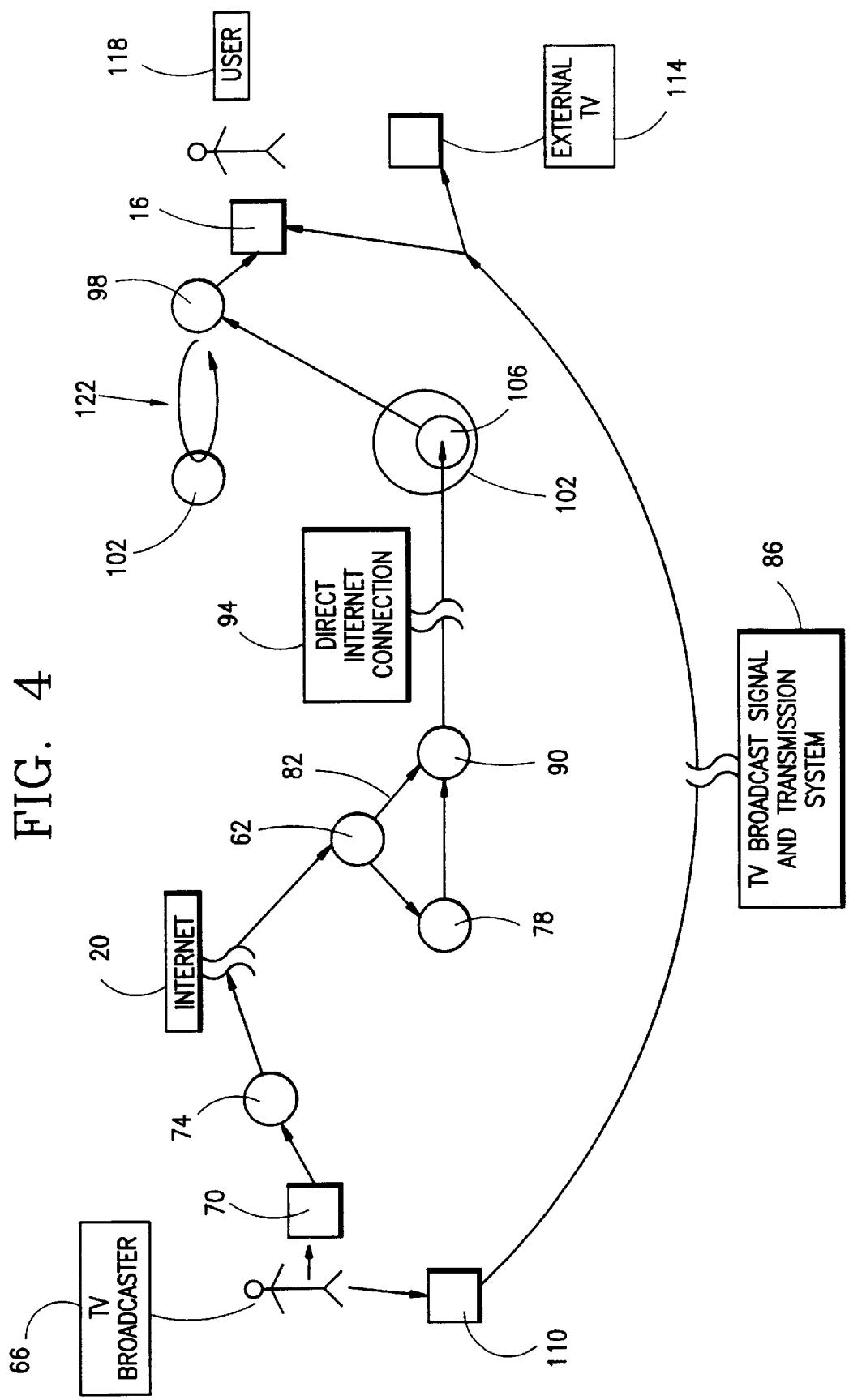

ENHANCED VIDEO PROGRAMMING SYSTEM AND METHOD FOR INCORPORATING AND DISPLAYING RETRIEVED INTEGRATED INTERNET INFORMATION SEGMENTS

This application is a continuation-in-part of U.S. application Ser. No. 08/615,143, filed Mar. 14,1996, entitled "AN INTEGRATED INTERACTIVE VIDEO AND INTERNET SYSTEM" (Attorney Docket No. 4247), which is a continuation-in-part of U.S. application Ser. No. 08/613,144, filed Mar. 8,1996, entitled "AN INTEGRATED INTERACTIVE VIDEO AND INTERNET SYSTEM" (Attorney Docket No. 4246), now abandoned.

BACKGROUND OF THE INVENTION

Today, the capabilities of computers to provide massive amounts of educational and entertainment information has exploded with the Internet. The Internet has the power to transform society through unprecedented levels of information flow between members. Currently, on-line systems offer a variety of different services to users, including news feeds, electronic databases (either searchable by the user directly on the on-line system, or downloadable to the user's own computer), private message services, electronic newsletters, real time games for play by several users at the same time, and job placement services, to name a few. However, today, most on-line communications occur merely through text. This currently stands in great contrast to the audio/visual presentation of the alternative electronic medium, television. However, it is expected that as multi-media's incessant growth continues, audio/visual programs will proliferate and text will become less and less dominant in the on-line environment. Even though these programs will be introduced, the Internet, will remain essentially user unfriendly due to its very massiveness, organization, and randomness. Simply stated, there is no order or direction in the Internet. Specific pieces of information are many times hard to find, and harder yet, is the ability to put that piece of information into a meaningful context.

Television, on the other hand, has been criticized for being a passive medium—"chewing gum for the eyes," as Fred Allen once observed. Television has always been something you watched, not something you do. Many social critics believe that the passivity television depends on has seeped into our entire culture, turning a nation of citizens into a nation of viewers. While interactive television systems have increased the level of user interaction, and thus, provided greater learning and entertainment opportunities, vast information resources such as databases are inaccessible from such a medium.

What is needed is a means to close the gap between video programming and the information superhighway of the Internet. What is needed is a wider, richer experience integrating audio/visual and textual database elements into an organized unique interactive, educational, entertainment experience. Currently, the Internet is a repository of information on virtually any subject. However, what is needed is a mechanism for combining the user-friendly visual experience of television with the vast information resources of the Internet.

SUMMARY OF THE INVENTION

The system of the present invention combines broadcast television programming and/or video programming which appears on a VHS or Beta tape, CD-ROM, DVD or other medium, or video programming at a video server (hereinafter "video programming") with the massive Internet, creating a new and powerful educational and entertainment medium. The system allows consumers to receive more information in a more efficient manner than either television or the Internet alone. Consumers not only can see a news report on television, but they can also read pertinent information about the report, as well as explore related information about the story. The program becomes the introduction to a particular subject, rather than the entire subject itself. The act of viewing a program has now become a more engaging, enriching experience.

The system can also create a more intimate relationship between the viewer and the program. The user might be solving problems or performing virtual experiments on the Internet site that a teacher is discussing in an educational television program. Similarly, the consumer might be solving problems that the fictional characters in a television program must solve. In both cases, the consumer is an active participant in the process, rather than a passive observer.

Instead of an undirected and unfocused exploration of Internet sites, by synching specific Internet pages to the video signal, the system puts the Internet in context. The television program producers now can decide what additional information to offer their audience. This material can now be seen in the context of the television program.

An additional advantage is that consumers don't have to search through the literally hundreds of millions of pages on the Internet to find appropriate material. The material has already been filtered by the program producers and delivered to the consumer automatically.

Another advantage of the system is that it changes the nature of advertising. Since additional information can be given to consumers automatically, advertising can now be more substantive, allowing customers to make more informed choices. Now, the act of purchasing a product seen on television can be streamlined—the consumer can be given the choice of buying the product instantly using the two-way capabilities of the system.

In addition, users can take advantage of the two-way capabilities of the Internet to respond to polls, to send e-mail or to link to additional sites. For example, a viewer watching a television news program, through the system of the invention, can receive a stream of Web pages which provide additional, specific information relating to the news content—whether background on the Presidential primaries or the latest change in interest rates.

The video programming and corresponding Internet pages can be viewed on personal computers equipped with a television card, but the open software-based approach enables anyone with a television set and JAVA enables PC to experience the system of the invention.

By marrying the appeal of television with the two-way data transfer capabilities of the Internet, the system creates a powerful new medium: Television producers and Internet site creators can enhance their content to extend their brand identity and differentiate their program offerings to the millions of people who are spending more time navigating through the resources of the World Wide Web rather than watching television; advertisers can speak more directly to consumers by directly sending Web pages to the consumer instead of only displaying Web addresses in their commercials; and consumers can gain a new level of interest and interactivity over a video-based medium. In addition to providing significant and immediate benefits to broadcasters and advertisers, the system will also present educational programmers with a way to more effectively use Internet resources in the classroom.

Recently, several media companies have joined to create a system for linking the Internet and television on the personal computer, called "Intercast." In this system, content will be provided simultaneously with the TV video signal. This system, however, requires that stripped down Web pages be sent in the vertical blanking interval (VBI) of the video signal, using up to three scan lines limiting effective bandwidth to approximately 28.8 kbps. This approach, however, requires specialized hardware to both insert the Web pages into the VBI and extract these codes at each PC since it takes up to three scan lines of the VBI. Thus, the complexity and cost of the PC is increased. Because the Web pages are transmitted with the video signal, the Intercast system is not a true "two-way" system, but merely a one-way "piggyback" system. In addition, the Intercast is an analog video product, and thus, cannot handle digital video data.

The system of the present invention, on the other hand, is a much more flexible, but less complex, system. The present invention supports either analog or digital television broadcasts without broadcasters or end-users having to alter their existing systems, thus enabling broadcasters to reach a wide audience within a short time.

In a first embodiment, the actual Web pages are not forced into the very limited bandwidth of the vertical blanking interval (VBI). Instead, merely eight fields of line 21 of the VBI are used to deliver the relevant Internet Web page addresses to the PC. These addresses are called "uniform resource locators" (URLs). The system then directs the particular Web browser to retrieve the identified Web pages from the Internet. Upon receipt of the particular Web page (s), the system syncs the Web page(s) to the video signal, and at the appropriate times, presents the Web pages on one portion of the computer screen with the television video signal, shown in a window on another portion of the screen, and thus, provides the synergistic Internet and television experience. One of the advantages of the system of the present invention is that no specialized chip set need be produced and implemented into the standard PC. Thus, complexity is kept to a minimum.

In another preferred embodiment of the present invention, the VBI is not used to transmit the URLs to the user. In this alternative embodiment, member broadcasters enter the Internet through a member account, and will be provided with a graphical user interface for pre-scheduling Internet addresses, or URLs, for transmission to users at particular times of day. This interface could also be used to transmit real time live transmissions of URLs to users at the same time as a broadcast. The URLs are stored in a "Link File" for later transmission over the Internet to the user at the broadcasters entered time, which corresponds to the broadcast time of an associated program. This embodiment eliminates the need to place the URLs in the VBI, and also allows the broadcaster to store more than one Link File for transmission to users in different time zones, for example. Further, more than one broadcaster could access the same master schedule if desired, and add or delete certain URLs to personalize the program for their local audiences. Also, personalization can be taken to the single user, or small group of users, by having the system send a different stream of URLs to each user, depending on a unique user profile, for example. Thus, the personalization feature of the present invention allows each user to receive information uniquely relevant to their interests, demographics, history, etc. This embodiment makes the transmission of URLs to the user even less complex than the first embodiment disclosed herein.

Thus, it is an object of the present invention to provide order and direction to the Internet by using television signals to place, orient and control such information in a meaningful context.

It is an object of the present invention to create a more intimate relationship between the viewer and the program by enriching the learning experience through the provision of more in-depth information.

DESCRIPTION OF THE DRAWINGS

FIG. 4 is a diagram showing another preferred system embodiment to achieve the direct transmission of URLs over the Internet to the user at a broadcaster's entered time without encoding the URLs into the VBI.

PREFERRED EMBODIMENT

Figure 1:
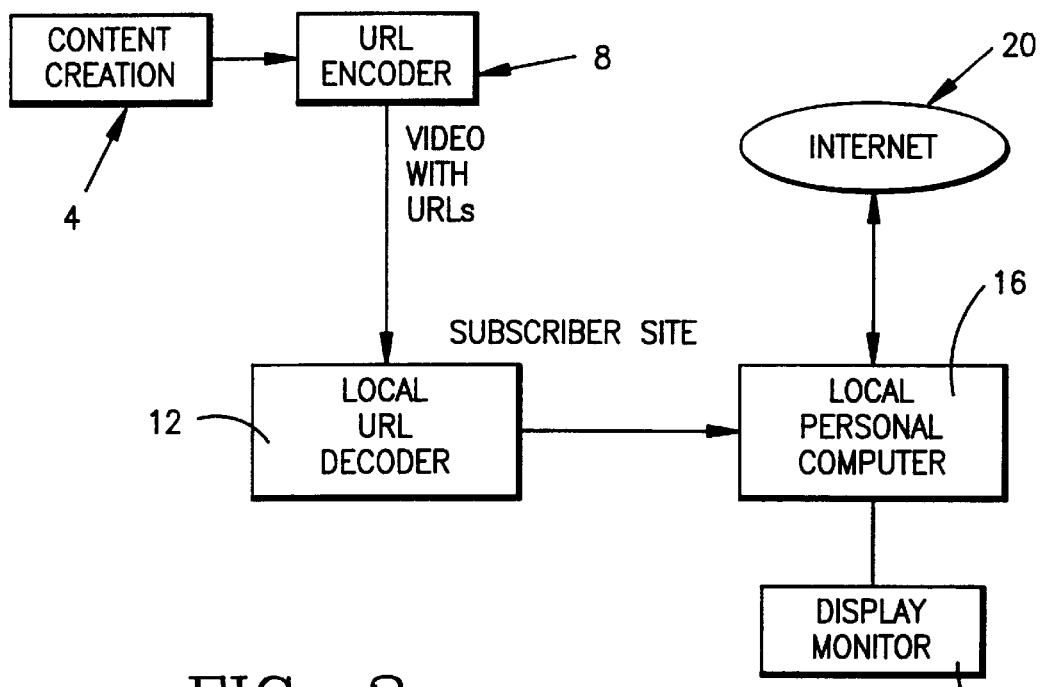
FIG. 1 is a diagram of the system design, showing the receipt and decoding of video signals at the subscriber location using the method of the present invention.

The system of the present invention combines the rich visual capabilities of television with the vast resources of the Internet. As shown in FIG. 1, a preferred embodiment of the invention is a computer based system for receiving a video program along with embedded uniform resource locators (URLs)—which direct the user's computer 16 to address locations, or Web sites, on the Internet 20 to retrieve related Web pages. These Web pages correspond to the video presentation. The particular video programming can be delivered in analog, digital or digitally compressed formats (e.g., MPEG2) via any transmission means, including satellite, cable, wire, or television broadcast.

The video programming is preferably created at a centralized location, i.e., content creation 4 as shown in FIG. 1, for distribution to subscribers in their homes, for example. Program creation is accomplished according to any conventional means known in the art. After a video program is created, uniform resource locators are embedded, in one preferred embodiment, into the vertical blank interval of the video programming by the URL encoder 8, shown in FIG. 1. In this embodiment, the URLs are encoded onto eight fields of line 21 of the VBI. Line 21 is the line associated with close captioning, among other things. However, the URLs could also be embedded in other fields of the VBI, in the horizontal portion of the video, as part of the audio channel, or in any subcarrier to the video. Preferably, the URLs have associated time stamps which indicate to the subscriber stations when, during the video program, to display the particular Web pages addressed by the URLs.

The particular information in line 21 is not part of the visual part of the program, and thus, is not perceptible to the human eye, thereby making it ideal to send data information to the users. While the bandwidth capacity of line 21 is limited, because the system of the present invention transmits only the uniform resource locators (URLs), and not full Web pages, there is more than enough capacity. Furthermore, no additional hardware is necessary at the PC 16 to implement the elements of the present invention. Thus, the present invention has the additional advantages of being very efficient and takes advantage of conventional hardware.

Once the video program is created, it can be transmitted to user sites over any transmission means, including broadcast, cable, satellite, or Internet, and may reside on video servers. Furthermore, the video program, with embedded URLs, can be encoded on a VHS or Beta tape, DVD or other medium.

Preferably, each receiver station comprises any Intel x86 machine (preferably a 486 processor, pentium processor, etc.), an Apple Computer, UNIX or any other type of standard computer workstation. The local PC 16 is preferably connected to either a cable and/or broadcast television connection or to a local VCR or other video source. At each subscriber site, the local personal computer 16 preferably receives the cable transmission by cable connection on the back of the personal computer 16. The video/audio program can then be processed for display on the computer screen using any conventional PC card capable of displaying NTSC signals on a computer monitor, such as a WinTV card. In addition to the cable connection, however, in the present invention there is also an Internet 20 connection created concurrently with the cable connection.

The Internet 20 connection can be via high-speed line, RF, conventional modem or by way of two-way cable carrying the video programming. The local PC 16 has Internet access via any of the current ASCII software mechanisms. In a preferred embodiment, at each subscriber home, an associated local URL decoder 12 receives the cable video television program, as shown in FIG. 1. The local URL decoder 12 extracts the URLs, preferably embedded in the vertical blanking interval, with the use of any conventional VBI decoder device. The URL decoder 12 may be either a stand-alone unit or a card which is implemented into the personal computer 16.

Figure 2:
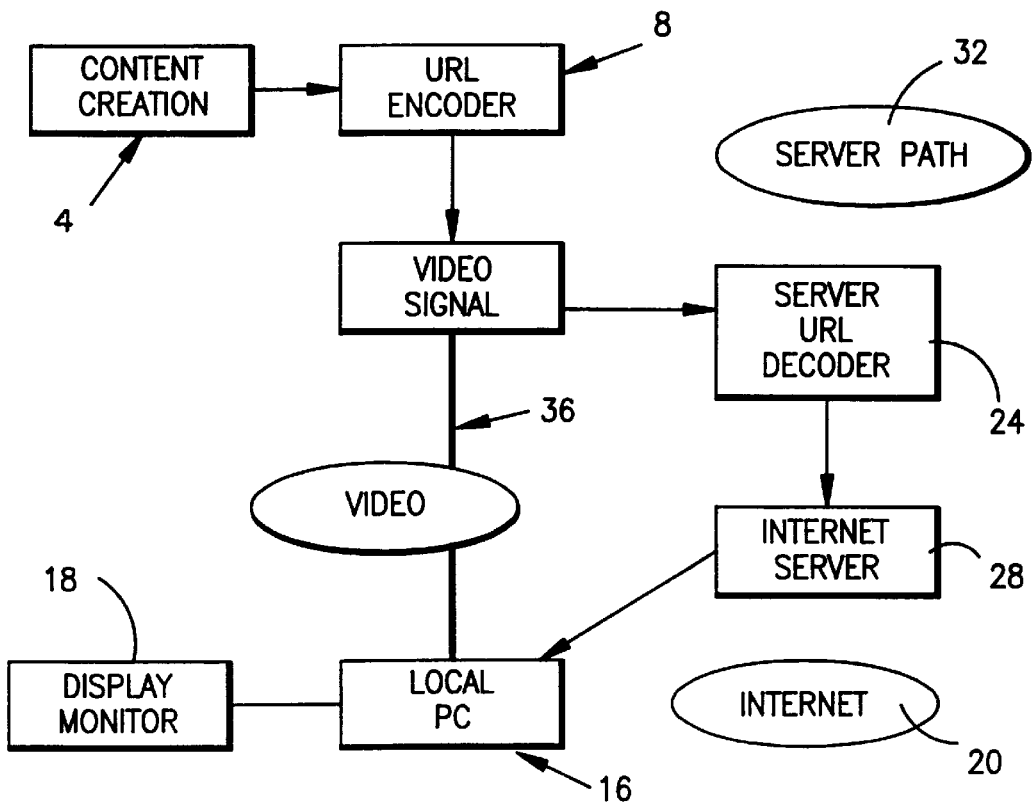
FIG. 2 is a diagram showing an alternative system embodiment to achieve the integration of the Internet information with the video content by decoding the uniform resource locators at a server site and then transmitting the URLs to the subscriber stations via the Internet.

In another preferred embodiment shown in FIG. 2, the uniform resource locators (URLs) are encoded into the video in the same manner as described above. Again, the URLs are preferably encoded onto eight fields of line 21 of the VBI. However, the URL decoder 24 is located at the server site, as opposed to the subscriber location. When the decoder 24 receives the video program signal, it strips out the URL codes on line 21 of the VBI and delivers these codes independently to an Internet server 28. The URL code is then subsequently delivered over the Internet 20 to the user PC 16. Simultaneously, the video is broadcast over conventional broadcast or cable transmission means 36 to the user's personal computer 16.

Another preferred embodiment of the system, shown in FIG. 4, does not depend on, or even use, the VBI. In this preferred embodiment, the system will run an online service over the Internet 20. This service will be in the form of an Internet Web site 62 that provides a user-interface to a database 78 and to one or more associated data servers 90. The service will provide member-accounts to TV broadcasters 66 who sign up to use the system of the invention in conjunction with their broadcasts. Each member broadcaster will enter the service at their computer 70 through Web browser software 74 using their member account by entering various identification and password information. Once within their account, the member will be provided with a graphical user interface for pre-scheduling URLs for transmission to users 118 over a direct Internet connection 94 at particular times of day. The same user interface, or a variation on it, can be used by broadcasters for live transmission 82 of URLs to users at the same time as a broadcast 86.

For example, one example of this interface might be a scheduling calendar (daily, weekly, monthly, yearly) in which the broadcaster 66 may allocate time periods which coincide with their broadcasts 86, and during which they will send out URLs to their users to link to Web pages. For each time period (for example, a particular hour long period during the day) determined by the broadcaster 66 to be a broadcast period (a period during which they want to transmit URLs that correspond to a television show being broadcast from their TV broadcast facility 110 to the external TV 114 of the user 118 at that time), the broadcaster 66 may then enter a series of URLs into an associated file ("Link File") for transmission over the Internet 20 at that time. This Link File might have a user interface such as a spreadsheet, table, or list, or it could be simply a tab-delimited or paragraph-delimited text-file. As an example, each of the records in the Link File consists of a data structure which could contain information such as:

(<timecode>,<URL>,<label or title>,<additional information>, <additional information>, . . .)

The above data structure is just one example. The records in the Link File preferably specify the time, Internet address (i.e. URL), label (such as an associated name), and some optional additional information, for each Web page the broadcaster 66 desires to launch during a show.

When a broadcaster 66 modifies their calendar and/or the Link File associated with any given time period(s) in their calendar, this information is saved into the database 78 that is attached to the site 62. Each broadcaster 66 may maintain multiple calendars in the database 78 if they broadcast in different time zones, for example.

The database 78 provides the Link File records for upcoming time periods to a server 90, which may be one server or a distributed network of server programs on multiple computers across the network, to be utilized for scaling to large national or global audiences. The server 90 provides the Link File records, including the URLs, to the user's personal computer 16, which is connected via a network. Examples of possible networks include the public Internet 94, a direct private network, or even a wireless network.

One feature of the above embodiment is that one or more broadcasters 66 may utilize the same schedule in the database 78 for their own broadcasts 86 or during the same broadcast. For example, a network broadcaster may develop a master schedule and various affiliate broadcasters may subscribe to that schedule or copy it (in the database) and add or delete specific URLs in the schedule for their local audiences or unique programming. This scheme enables affiliates to insert URLs for local advertisers or local subjects into a sequence of more general URLs provided by their network broadcaster 66. In other words, the affiliate can add links that ride on the network feed and then redistribute it to their local audiences.

The above embodiment can also enable personalization in the form of unique series of URLs specific to each user's unique profile, which is directly sent over the Internet 20 to each user's specific client software 106. This can be achieved from the broadcaster 66 to each individual user 118, or to particular collections of users. To accomplish personalization, the service may send a different stream of URLs to each user's client software program 106. The stream of URLs sent would depend on a user profile stored in the database 78 or the client software program 106, a user profile which is built on demand or over time for each user 118 based on criteria such as the location of the user, choices the user makes while using a client software program 106, or choices the broadcaster 66 makes during a broadcast 86, or automatic choices made by an algorithm (such as a filter) residing on the service 62. Personalization enables each user to receive URLs which are uniquely relevant to their interests, demographics, history, or behavior in the system.

System Operation

Once the URLs have reached the personal computer 16, system operation is similar for all of the embodiments diagrammed in FIGS. 1, 2, and 4.

Figure 3:
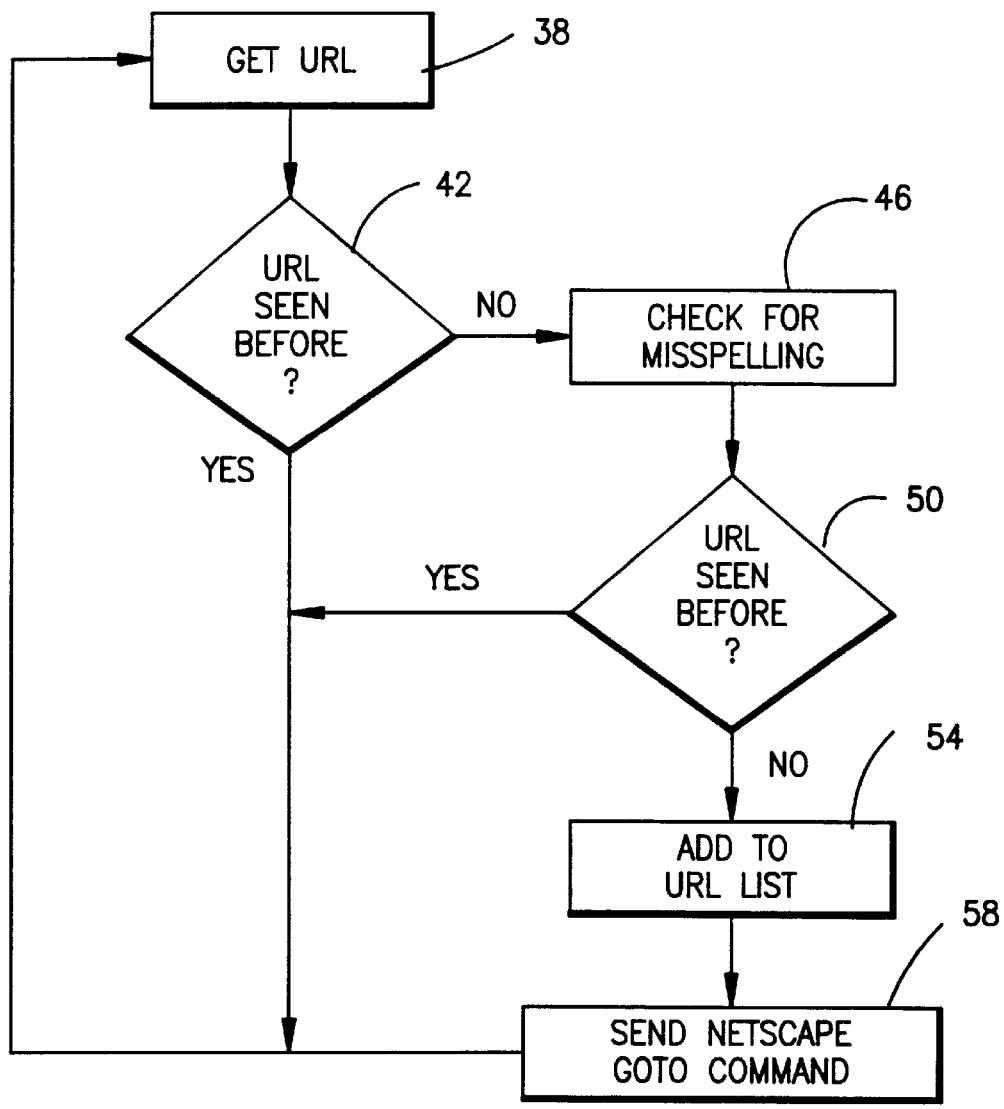
FIG. 3 is a flow diagram of the basic software design of the present invention.

In a preferred embodiment, a JAVA enabled browser 98 as well as specialized software 106 for performing part of the method of the present invention are installed on the computer 16. The JAVA enabled browser 98 allows the computer 16 to retrieve the Web pages 102 and is preferred software, since it is platform independent, and thus, enables efficient and flexible transfer of programs, images, etc., over the Internet 20. The specialized interface software 106 (hereinafter, "client software"), attached as Appendix A, acts as an interface between the video programming and the Internet functions of the present invention. The client software 106 retrieves URLs from the video program (embodiment of FIG. 1) or directly from the Internet connection (embodiments of FIGS. 2 and 4), interprets these URLs and directs the JAVA enabled browser 98 to retrieve the particular relevant Web pages 102, and synchronizes the retrieved Web pages to the video content for display on the user's computer 16, as shown in FIGS. 3 and 4 and explained in more detail below.

In a preferred method, the URLs are encoded and embedded into the video signal by inserting them into the vertical blanking interval (VBI), as mentioned above.

In another preferred embodiment, the URLs are entered by member TV broadcasters 66 along with specified times for transmitting the URLs to the user. At the appropriate times, the URLs are sent directly over the Internet to the user's PC 16 via the client software 106 over a direct point-to-point or multicasting connection.

One method of the present invention has the capability to detect identical URLs sent directly after one another which causes the browser not to fetch URLs in these particular cases. As shown in FIG. 3, once the URL code is received at the computer, the client software 106 first interprets the URL and determines in step 42 whether the particular URL has been received previously. If it has already been received, the next received URL is interpreted for determination of prior receipt. If the particular URL has not been detected before, the software checks for misspelling in step 46 and any other errors, and if errors exist, corrects these particular errors. Once again, it is determined whether the URL has been previously detected. If it has, the next URL is accessed in step 38. If the URL has not been detected, the specific URL is added to the URL list in step 54. The specific URL is then sent to the Web browser, preferably a JAVA enabled browser 98. Upon receipt of the URL, the browser 98, in step 58, will access the Web site address 122 (FIG. 4) indicated by the URL and retrieve the cited Web page(s) 102 via the Internet.

Viewers can view the integrated presentation in the following manner. As mentioned above, the video signal is processed and displayed on a video window on the PC screen using a WinTV card, for example. The corresponding audio is forwarded to the audio card and sent to the PC speakers.

The actual retrieved Web pages 102, referenced by the URL, are optionally time stamped to be displayed on the computer screen when predetermined related video content is displayed in the video window, thus, enlightening and enhancing the video presentation by providing in-depth information related to the video content thereto. Another section on the screen is also preferably used to represent an operational control panel. This control panel provides a list of the URLs that have been broadcast and correspondingly received by the computer 16. This control panel is updated to add a URL code each time a new URL code is received by the PC 16. This list gives the subscriber the flexibility to go back and retrieve particularly informative or interesting Web pages that have already-been displayed earlier in the program, or alternatively, to print them out for future reference. Furthermore, the list could include URLs referring to Web pages not displayed with the broadcast program, but that provide further information on a certain topic of interest to the viewer.

The present invention can best be understood with reference to an example. A viewer can begin watching a musical video featuring a new band, for example. As the video is received by the PC 16, URLs are either being extracted from the vertical blanking interval or are being received directly via the Internet 20, and are being. interpreted by the client software 106. Upon direction and command, the JAVA enabled browser 98 retrieves particular Web pages 102 from Internet 20 Web sites identified in the, URLs. These Web pages 102 will then be displayed on the video screen at particular times. Thus, for example, while the viewer is watching the music video, biographical information on the band can also be displayed adjacently to the video window. Web pages 102 could also include an upcoming concert schedule, or even audio clips of the band's music may be downloaded from the Internet 20. As another example, a user could be watching a program relating to financial news. While the narrator is shown discussing high tech stocks, Web pages corresponding to detailed financial performance information on high tech stocks, environment and characteristics can be displayed with the video on the computer screen. When the program narrator switches to a discussion on the weekly performance of the Dow Jones, Web pages presenting related financial performance information can be simultaneously displayed. Thus, it is evident that the present invention profoundly enriches the viewing and learning experience.

It is understood that there can exist alternative embodiments for use with the present invention. For example, the user can view the interactive program using a television set 114 or other display monitor in conjunction with the display screen of the personal computer 16. In this embodiment, the relevant Web pages are shown on the personal computer 16 while the video program is displayed on the television monitor 114. In this alternative embodiment, a cable set top box receives the television program from the multichannel cable. The personal computer 16 also receives the video program from the multi-channel cable and extracts the URLs, embedded in the vertical blanking interval of the video signal or directly transmitted 94 over the Internet 20. The client software 106 extracts the URLs and retrieves the particular Web pages as described above. The Web pages are then synchronized with the particular video frames and presented to the user. It is understood that a hyperlink may exist on the Web site that will allow the user to automatically load the client software and call up the specific television channel referenced in the Web site. For example, someone browsing the Internet 20 may come upon a major television network's Web site. They scroll to an interesting story then click on an hyperlink to turn on the software which tunes the TV window to the network to enhance the information residing at the Web site.

Furthermore, instead of receiving the video program from a transmission means, the video program can be addressed directly from the user site if the video program, with embedded URLs, is stored on a VHS, Beta, DVD or other medium. In this embodiment, the user PC 16 and/or television 114 are connected to a VCR, DVD player or other appropriate device.

Using the foregoing embodiments, methods and processes, the system of the present invention creates a synergistic experience combining the vast resources of the Internet with the presentation capabilities of television.

APPENDIX A nativeInputStream.java

```
/**********************************************************************
*
Copyright Notice: This source code is (C) Copyright 1996, EarthWeb LLC.

All Rights Reserved. Distribution of this document or it's resulting
compiled code is granted for non-commercial use, with prior approval of
EarthWeb LLC. Distribution of this document or its resulting compiled
code, for commercial use, is granted only with prior written approval o
f
EarthWeb, LLC. For information, send email to info@earthweb.com.
**********************************************************************
/
public class nativeInputStream extends java.io.InputStream {
  public native int read();
  public native void nativeinit();
  public nativeInputStream() {
    super();
    nativeinit();
  }
  static {
    System.loadLibrary("instream");
  }
}
``` nativeInputStreamCode.cpp

```cpp
/************************************************************************
*
Copyright Notice: This source code is (C) Copyright 1996, EarthWeb LLC.

All Rights Reserved. Distribution of this document or it's resulting
compiled code is granted for non-commercial use, with prior approval of
EarthWeb LLC. Distribution of this document or its resulting compiled
code, for commercial use, is granted only with prior written approval o
f
EarthWeb, LLC. For information, send email to info@earthweb.com.
*************************************************************************
/
#include <StubPreamble.h>
#include "nativeInputStream.h"
#include <Windef.h>
#include <Winbase.h>
#include <stdio.h>

HANDLE h;

long nativeInputStream_read(struct HnativeInputStream *) {
    DWORD evttype;
    unsigned long nread = 0; // the number of characters read
    unsigned char result; // the character read
    while (nread == 0) ReadFile(h, (LPVOID)&result, 1, &nread, NULL);
    return (long)result;
} void nativeInputStream_nativeinit(struct HnativeInputStream *) {
    h = CreateFile("COM1", GENERIC_READ|GENERIC_WRITE, 0, NULL,
                        OPEN_EXISTING, 0, NULL);
    DCB dcb;
    GetCommState(h, &dcb);
    dcb.BaudRate    = 9600;
    dcb.ByteSize    = 8;
    dcb.Parity      = NOPARITY;
    dcb.StopBits    = ONESTOPBIT;
    SetCommState(h, &dcb);
    SetCommMask(h, EV_RXCHAR);
    char *comcode = "\1B";
    unsigned long nwritten = 0;
    while (nwritten<2) WriteFile(h, (LPVOID)comcode, 2, &nwritten, NULL
);
    printf("Yeah!");
}
```

Serial.cpp

```cpp
/***************************************************************
*
Copyright Notice: This source code is (C) Copyright 1996, EarthWeb LLC.

All Rights Reserved. Distribution of this document or it's resulting
compiled code is granted for non-commercial use, with prior approval of
EarthWeb LLC. Distribution of this document or its resulting compiled
code, for commercial use, is granted only with prior written approval o
f
EarthWeb, LLC. For information, send email to info@earthweb.com.
****************************************************************
/
#include <Wintypes.h>
#include <Winbase.h>
#include <Windef.h>
#include <stdio.h>
#include <conio.h>

//#define COM1 = 0x3F8
//#define COM2 = 0x2F8

HANDLE h;
int main() {
    unsigned char result;
    unsigned long nread;

h = CreateFile("COM1", GENERIC_READ|GENERIC_WRITE, 0, NULL,
                    OPEN_EXISTING, 0, NULL);
    if (h == INVALID_HANDLE_VALUE) {
        printf("NOOOOO!");
    }
    DCB dcb;
    GetCommState(h, &dcb);
    dcb.BaudRate    = 9600;
    dcb.ByteSize    = 8;
    dcb.Parity      = NOPARITY;
    dcb.StopBits    = ONESTOPBIT;
    SetCommState(h, &dcb);

SetCommMask(h, EV_RXCHAR);
        printf("Reading serial port:\n");

DWORD evttype;
        while (1) {
        printf("%c", nativeInputStream_read() {
/*          WaitCommEvent(h, &evttype, NULL);
        while (ReadFile(h, (LPVOID)&result, 1, &nread, NULL))
                printf("%c", result); */
        }
        return 0;
}
```

Page 1

A 4

Serial.cpp

```
long nativeInputStream_read() {
    DWORD evttype;
    unsigned long nread; // the number of characters read
    unsigned char result; // the character read
    WaitCommEvent(h, &evttype, NULL);
    ReadFile(h, (LPVOID)&result, 1, &nread, NULL);
    return (long)result;
}
```

TVcontrol.java

```
/*********************************************************************
*
Copyright Notice: This source code is (C) Copyright 1996, EarthWeb LLC.
,
All Rights Reserved. Distribution of this document or it's resulting
compiled code is granted for non-commercial use, with prior approval of
EarthWeb LLC. Distribution of this document or its resulting compiled
code, for commercial use, is granted only with prior written approval o
f
EarthWeb, LLC. For information, send email to info@earthweb.com.
*********************************************************************
/ import java.applet.*;
import java.awt.*;
import java.io.*;
import java.net.URL;
import java.net.MalformedURLException;
import java.util.Hashtable;

class blackPanel extends Panel {
        public void paint(Graphics g) {
                g.setColor(Color.black);
                g.fillRect(0, 0, size().width, size().height);
        }
} class displayFrame extends Panel implements Runnable {
        int xoffset = 30;
        int yoffset = 40;

List URLlist;
//      TextField text1;
        Checkbox autobrowse;
        String text1Str = "";
        int rlx, rly;
        AppletContext apc;

Thread thread;
        InputStream din;
        Hashtable dict;
        Hashtable visited;

boolean periodbefore; // HACK ALERT public displayFrame(String frameName, AppletContext apc, InputS
tream in) {
//              super(frameName);
                this.apc = apc;
                din = in;
           dict = new Hashtable();
           visited = new Hashtable();
```

Page 1

A6

TVcontrol.java

```
        thread = new Thread(this);
        thread.start();

resize(106 + xoffset, 156 + yoffset);

rlx = -(size().width/4);
                rly = size().height/4;

setLayout( new BorderLayout() );
                add( "South", autobrowse = new Checkbox("Autobrowse"));
                autobrowse.setState(true);

URLlist = new List();
                add("Center", URLlist);
                //rl.setConstraint(URLlist, autobrowse, RelativeLayout.
under, -4, 10);
                //rl.setConstraint(URLlist, button0, RelativeLayout.und
er, -4, 10);
//              URLlist.setBackground( Color.cyan );
//              Font newfont = new Font("TimesRoman", Font.PLAIN, 10);
//              URLlist.setFont( newfont );

} public synchronized void turnToURL(String s, String target) {
                System.out.println("Turning to URL " + s + target);
                visited.put(s, this);
                try apc.showDocument(new java.net.URL(s), target);
                catch (Exception e);
        } public void turnToTitle(String s, String target) {
                System.out.println("Turning to Title " + s + target);
                turnToURL((String)(dict.get(s)), target);
        } public synchronized void addURL(String title, String url) {
          String previous = (String)(dict.get(title));
          if (!(dict.containsKey(title))) URLlist.addItem(title);
          dict.put(title, url);
        } public void run() {

Thread.currentThread().setPriority( Thread.MIN_PRIORITY );
//System.out.println("Context: "+apcon);
                char buf[] = new char[128];
                int bufidx = 0;
                boolean capture = false;
                String currentTitle = null;

try {
```

Page 2
A7

TVcontrol.java

```
                // Listener loop
                        int c;
periodbefore = false;
                        while ((c = (din.read())) != -1) {
                          if (c == '.') {
                                if (capture && periodbefore) {
                                   bufidx--;
                                   c = (byte)'>';
                                   periodbefore = false;
                                } else periodbefore = true;
                          } else periodbefore = false;
                          if ((char)c == '>') {
                                capture = false;
                                String result = new String(buf, 0, bufi
dx);
                                System.out.println("Remote found tag "+
result);
                                if (result.startsWith("URL:")) {
                                   result = result.substring(4);
                                   if (currentTitle != null) addURL(curr
entTitle, result);

if (autobrowse.getState() && !(visite
d.containsKey(result))) {
                                        URLlist.select(URLlist.countIte
ms()-1);
                                        turnToURL(result, "browser");
                                   }
                                   currentTitle = null;
                                }
                                else if (result.startsWith("Title:"))
                                   currentTitle = result.substring(6);
                          }
                          if (capture) {
                                buf[bufidx++] = (char)c;
                                if (bufidx >= buf.length)
                                   capture = false;
                          }
                          if ((char)c == '<') {
                                capture = true;
                                bufidx = 0;
                          }
                        }
        // This is an acceptable exception
        } catch( EOFException e ) System.out.println( "URLClient: eof" );
        // This is probably not.
        catch( IOException e ) System.out.println( "URLClient.run: "+e );
          }

//      public void paint(Graphics g) {
```

TVcontrol.java

```
//              g.setColor(Color.black);
//              g.fillRect(0, 0, size().width, size().height);
//      } public void update(Graphics g) {
                repaint();
        } public boolean action(Event evt, Object what) {
                URL where;

turnToTitle((String)what, "browser");
                repaint();
                return true;
        }
} public class TVcontrol extends Applet {
        static displayFrame remoteFrame = null;

public void init() {
                InputStream in;
                AppletContext apc = getAppletContext();

in = new nativeInputStream();
                setLayout(new BorderLayout());

if (remoteFrame == null)
                        remoteFrame = new displayFrame("Remote Control"
, apc, in);
                add("Center",remoteFrame);
                remoteFrame.show();
        }
        public void start() {
                remoteFrame.apc = getAppletContext();
        }
}
```

```
                              index.html

<TITLE>WebTV</TITLE>

<FRAMESET ROWS="33,66">
        <FRAMESET COLS="35,65">
        <FRAME SCROLLING="no" NAME="tv" SRC="file://once-ler/pub/moo.tv
">
        <FRAME SCROLLING="no" NAME="control" SRC="control.html">
                <NOFRAMES>blank.html</NOFRAMES>
        </FRAMESET>

<FRAME SCROLLING="yes" NAME="browser" SRC="browser.html">
</FRAMESET>
``` control.html

```
<title>Remote</title>

<center>
<applet code="TVcontrol.class" width=300 height=100></applet>
</center>
``` browser.html

```
<title></title>

<body bgcolor="#ffffff">

<center><b>This is the browser window.</b></center>
``` inst.h

```
/************************************************************
*
Copyright Notice: This source code is (C) Copyright 1996, EarthWeb LLC.
'
All Rights Reserved. Distribution of this document or it's resulting
compiled code is granted for non-commercial use, with prior approval of
EarthWeb LLC. Distribution of this document or its resulting compiled
code, for commercial use, is granted only with prior written approval o
f
EarthWeb, LLC. For information, send email to info@earthweb.com.
*************************************************************
/
#ifndef __INST_H__
define __INST_H__ include "npapi.h"

class CPluginWindow;

//
// Instance state information about the plugin.
//
// *Developers*: Use this struct to hold per-instance
//               information that youÕll need in the
//               various functions in this file.
//
typedef struct _PluginInstance
{
    NPWindow*       fWindow;
    uint16          fMode;
        CPluginWindow*  window;
} PluginInstance;

#endif
```

Npshell.cpp

```
/***********************************************************************
*
Copyright Notice: This source code is (C) Copyright 1996, EarthWeb LLC.
*
All Rights Reserved. Distribution of this document or it's resulting
compiled code is granted for non-commercial use, with prior approval of
EarthWeb LLC. Distribution of this document or its resulting compiled
code, for commercial use, is granted only with prior written approval o
f
EarthWeb, LLC. For information, send email to info@earthweb.com.
***********************************************************************
/
//#include "windows.h"
#ifndef _NPAPI_H_
#include "npapi.h"
#endif
#include "inst.h"
#include "plgwnd.h"
#include "wintv.h"

//-----------------------------------------------------------------------
-----------------
// NPP_Initialize:
//-----------------------------------------------------------------------
-----------------
NPError NPP_Initialize(void)
{
        PCV_Initialize();
    return NPERR_NO_ERROR;
}

//-----------------------------------------------------------------------
-----------------
// NPP_Shutdown:
//-----------------------------------------------------------------------
-----------------
void NPP_Shutdown(void)
{
        WTV_Exit(0);
}

//-----------------------------------------------------------------------
-----------------
// NPP_New:
//-----------------------------------------------------------------------
-----------------
NPError NP_LOADDS
NPP_New(NPMIMEType pluginType,
```

Page 1

Npshell.cpp

```
                NPP instance,
                uint16 mode,
                int16 argc,
                char* argn[],
                char* argv[],
                NPSavedData* saved)
{
    if (instance == NULL)
        return NPERR_INVALID_INSTANCE_ERROR;

instance->pdata = NPN_MemAlloc(sizeof(PluginInstance));
    PluginInstance* This = (PluginInstance*) instance->pdata;
    if (This != NULL)
    {
        This->fWindow = NULL;
                This->window = NULL;
        This->fMode = mode;     // Mode is NP_EMBED, NP_FULL, or NP_BACK
GROUND (see npapi.h)

instance->pdata = This;   // save my data pointer in the
 instance pdata pointer
                                          // this will be passed back to me in a
ll calls so that I
                                          // can extract it later return NPERR_NO_ERROR;
    }
    else
        return NPERR_OUT_OF_MEMORY_ERROR;
} static void UnSubclass(PluginInstance *This)
{
    WNDPROC     OldWndProc;
    WNDPROC*    lplpfn = This->window->GetSuperWndProcAddr();

if ( !*lplpfn )
    {
        ASSERT(0);
        return;
    }

// Set the original window procedure
    OldWndProc = (WNDPROC)::SetWindowLong( This->window->m_hWnd, GWL_WNDPROC, (LONG) *lplpfn );

// A subclassed window's procedure is always AfxWndProc.
    // If this is not TRUE, then it's not a subclassed window.
```

Page 2

A 15

Npshell.cpp

```cpp
    if ( OldWndProc != AfxWndProc )
        ASSERT(0);
} static void KillTvWindow(PluginInstance *This)
{
/*    if (This->cAvi) {
        This->cAvi->Close();
        delete This->cAvi;
        This->cAvi = NULL;
    }  */
    UnSubclass(This);
    if (This->window) {
        This->window->Detach();
        delete This->window;
        This->window = NULL;
    }
}

//------------------------------------------------------------------
// NPP_Destroy:
//------------------------------------------------------------------
NPError NP_LOADDS
NPP_Destroy(NPP instance, NPSavedData** save)
{
    if (instance == NULL)
        return NPERR_INVALID_INSTANCE_ERROR;

PluginInstance* This = (PluginInstance*) instance->pdata;

if (This != NULL)
    {
            KillTvWindow(This);
        NPN_MemFree(instance->pdata);
        instance->pdata = NULL;
    } return NPERR_NO_ERROR;
}

//------------------------------------------------------------------
// NPP_SetWindow:
//------------------------------------------------------------------
```

Npshell.cpp

```cpp
NPError NP_LOADDS
NPP_SetWindow(NPP instance, NPWindow* window)
{
    if (instance == NULL)
        return NPERR_INVALID_INSTANCE_ERROR;

PluginInstance* This = (PluginInstance*) instance->pdata;

if (!window)
        return NPERR_GENERIC_ERROR;

if (!instance)
        return  NPERR_INVALID_INSTANCE_ERROR;

if (!This)
        return NPERR_GENERIC_ERROR;

if (!window->window && !This->window) // spurious entry
        return NPERR_NO_ERROR;

if (!window->window && This->window)
    {   // window went away
        KillTvWindow(This);
        return NPERR_NO_ERROR;
    }
        if (!This->window && window->window) {
                This->window = (CPluginWindow *) new CPluginWindow();
        if (!This->window->SubclassWindow((HWND)window->window)) {
            MessageBox(NULL,"SubclassWindow Failed","Plug-in-test",MB_O
K);
            return NPERR_GENERIC_ERROR;
        }
                PCV_EnableColorKey();
                WTV_ResetAudio();
                This->window->StoreData(This);
        }
    This->window->InvalidateRect(NULL);
    This->window->UpdateWindow();

RECT r;
        GetWindowRect((HWND)window->window, &r);
        PCV_DisableVideo();
        PCV_CreateWindow(r.left, r.top, window->width, window->height,
1);
        PCV_EnableVideo();
        WTV_CheckQFactor();

//        ((HWND)window->window)->hbrBackground = This->bkbrush;
//        InvalidateRect((HWND)window->window, NULL, TRUE);

This->fWindow = window;
```

Npshell.cpp

```cpp
    return NPERR_NO_ERROR;
}

//-------------------------------------------------------------------------------
// NPP_NewStream:
//-------------------------------------------------------------------------------
NPError NP_LOADDS
NPP_NewStream(NPP instance,
                        NPMIMEType type,
                        NPStream *stream,
                        NPBool seekable,
                        uint16 *stype)
{
    if (instance == NULL)
        return NPERR_INVALID_INSTANCE_ERROR;
    PluginInstance* This = (PluginInstance*) instance->pdata;

return NPERR_NO_ERROR;
} int32 STREAMBUFSIZE = 0X0FFFFFFF;   // If we are reading from a file in
 NPAsFile
                                    // mode so we can take any size str
eam in our
                                    // write call (since we ignore it)

//-------------------------------------------------------------------------------
// NPP_WriteReady:
//-------------------------------------------------------------------------------
int32 NP_LOADDS
NPP_WriteReady(NPP instance, NPStream *stream)
{
    if (instance != NULL)
    {
        PluginInstance* This = (PluginInstance*) instance->pdata;

} return STREAMBUFSIZE;   // Number of bytes ready to accept in NPP_W
rite()
}
```

Page 5

A 18

Npshell.cpp

```cpp
//-------------------------------------------------------------------------------
// NPP_Write:
//-------------------------------------------------------------------------------
int32 NP_LOADDS
NPP_Write(NPP instance, NPStream *stream, int32 offset, int32 len, void *buffer)
{
    if (instance != NULL)
    {
        PluginInstance* This = (PluginInstance*) instance->pdata;

} return len;          // The number of bytes accepted
}

//-------------------------------------------------------------------------------
// NPP_DestroyStream:
//-------------------------------------------------------------------------------
NPError NP_LOADDS
NPP_DestroyStream(NPP instance, NPStream *stream, NPError reason)
{
    if (instance == NULL)
        return NPERR_INVALID_INSTANCE_ERROR;
    PluginInstance* This = (PluginInstance*) instance->pdata;

return NPERR_NO_ERROR;
}

//-------------------------------------------------------------------------------
// NPP_StreamAsFile:
//-------------------------------------------------------------------------------
void NP_LOADDS
NPP_StreamAsFile(NPP instance, NPStream *stream, const char* fname)
{
    if (instance != NULL)
    {
        PluginInstance* This = (PluginInstance*) instance->pdata;

}
```

Npshell.cpp

```
}

//------------------------------------------------------------------------
// NPP_Print:
//------------------------------------------------------------------------
void NP_LOADDS
NPP_Print(NPP instance, NPPrint* printInfo)
{
    if(printInfo == NULL)   // trap invalid parm
        return;

if (instance != NULL)
    {
        PluginInstance* This = (PluginInstance*) instance->pdata;

if (printInfo->mode == NP_FULL)
        {
            void* platformPrint = printInfo->print.fullPrint.platformPrint;
            NPBool printOne = printInfo->print.fullPrint.printOne;

printInfo->print.fullPrint.pluginPrinted = FALSE; // Do the default

}
        else    // If not fullscreen, we must be embedded
        {
            NPWindow* printWindow = &(printInfo->print.embedPrint.window);
            void* platformPrint = printInfo->print.embedPrint.platformPrint;

}
    }
}

//------------------------------------------------------------------------
// NPP_HandleEvent:
// Mac-only.
//------------------------------------------------------------------------
int16 NPP_HandleEvent(NPP instance, void* event)
{
    NPBool eventHandled = FALSE;
    if (instance == NULL)
```

Page 7

A 20

Npshell.cpp

```
    return eventHandled;
  PluginInstance* This = (PluginInstance*) instance->pdata;

return eventHandled;
}
```

```
                                Plgwnd.cpp

/**********************************************************************
*
Copyright Notice: This source code is (C) Copyright 1996, EarthWeb LLC.
,
All Rights Reserved. Distribution of this document or it's resulting
compiled code is granted for non-commercial use, with prior approval of
EarthWeb LLC. Distribution of this document or its resulting compiled
code, for commercial use, is granted only with prior written approval o
f
EarthWeb, LLC. For information, send email to info@earthweb.com.
**********************************************************************
/
#include "stdafx.h"
#include "plgwnd.h"
#include <mmsystem.h>
#include "wintv.h"

// CPluginWindow constructor:
//
CPluginWindow::CPluginWindow()
{
    m_data = NULL;
} void CPluginWindow::OnPaint() {
        CPaintDC dc(this); // device context for painting //CWnd::OnPaint();
        CBrush brush(WTV_GetKeyColor());
        dc.FillRect(&(dc.m_ps.rcPaint), &brush);
}

/*void CPluginWindow::OnMove(int x, int y) {
        POINT worg;
        PCV_DisableVideo();
    PCV_SetWindowPosition((WORD)worg.x,(WORD)worg.y);
        WTV_CheckQFactor();
        PCV_EnableVideo();
} */ void CPluginWindow::StoreData(PluginInstance *data) {
        m_data = data;
}

/////////////////////
// Return place to hold original window proc
WNDPROC* CPluginWindow::GetSuperWndProcAddr()
{
#ifdef WIN32
        return CWnd::GetSuperWndProcAddr();
#else
    static WNDPROC pfnSuper;   // place to store window proc
```

Plgwnd.cpp

```
    return &pfnSuper;        // always return the same address
#endif
}

// CMainWindow message map:
// Associate messages with member functions.
//
// It is implied that the ON_WM_PAINT macro expects a member function
// "void OnPaint()".
//
BEGIN_MESSAGE_MAP( CPluginWindow, CWnd )
        //{{AFX_MSG_MAP( CMainWindow )
        ON_WM_PAINT()
//      ON_WM_MOVE()
        //}}AFX_MSG_MAP
END_MESSAGE_MAP()
```

Plgwnd.h

```
/*********************************************************************
*
Copyright Notice: This source code is (C) Copyright 1996, EarthWeb LLC.

All Rights Reserved. Distribution of this document or it's resulting
compiled code is granted for non-commercial use, with prior approval of
EarthWeb LLC. Distribution of this document or its resulting compiled
code, for commercial use, is granted only with prior written approval o
f
EarthWeb, LLC. For information, send email to info@earthweb.com.
*********************************************************************
/
#ifndef __PLGWND_H__
define __PLGWND_H__ include "npapi.h"
include "stdafx.h"

#include "inst.h"

////////////////////////////////////////////////////////////////////////
//////

// CPluginWindow:
//
class CPluginWindow : public CWnd
{
protected:
    PluginInstance * m_data;
//    CWnd * m_videoWnd;
public:
        CPluginWindow();
    void StoreData(PluginInstance *);
    virtual WNDPROC* GetSuperWndProcAddr();

//{{AFX_MSG( CMainWindow )
        afx_msg void OnPaint();
//        afx_msg void OnMove(int x, int y);
        //}}AFX_MSG

DECLARE_MESSAGE_MAP()
};

#endif
```

Npdll32.rc2

```
// PLUGTEST.RC2 - resources Microsoft Visual C++ does not edit directly
// ifdef APSTUDIO_INVOKED
    #error this file is not editable by Microsoft Visual C++
endif //APSTUDIO_INVOKED /////////////////////////////////////////////////////////////////////////////
//
// Version
//

VS_VERSION_INFO VERSIONINFO
 FILEVERSION 1,0,0,1
 PRODUCTVERSION 1,0,0,1
 FILEFLAGSMASK 0x3fL
#ifdef _DEBUG
 FILEFLAGS 0x1L
#else
 FILEFLAGS 0x0L
#endif
 FILEOS 0x4L
 FILETYPE 0x2L
 FILESUBTYPE 0x0L
BEGIN
    BLOCK "StringFileInfo"
    BEGIN
        BLOCK "040904e4"
        BEGIN
            VALUE "CompanyName",      "Earthweb LLC\0"
            VALUE "FileDescription",  "Win/TV Inline Plugin\0"
            VALUE "FileVersion",      "0.0.0.1\0"
            VALUE "InternalName",     "Inline TV\0"
            VALUE "LegalCopyright",   "Copyright Earthweb LLC 1996\0"
            VALUE "LegalTrademarks",  "\0"
            VALUE "OriginalFilename", "npdll32.dll\0"
            VALUE "ProductName",      "Inline TV Plugin\0"
            VALUE "ProductVersion",   "0.0.0.1\0"
            VALUE "MIMEType",         "fake/mime-type\0"
            VALUE "FileExtents",      "tv\0"
            VALUE "FileOpenName",     "Fake MIME (*.tv)\0"
        END
    END
    BLOCK "VarFileInfo"
    BEGIN
        VALUE "Translation", 0x409, 1252
    END
END
```

Npdll32.rc2

```
/////////////////////////////////////////////////////////////////////
//////
// Add manually edited resources here...
/////////////////////////////////////////////////////////////////////
//////
```

We claim:

1. A system for presenting integrated television programming and corresponding related Internet information segments obtained from Web sites on the Internet, the system comprising:

a first means for receiving programming, wherein the programming contains a video signal and an audio signal;

a second means for receiving one or more uniform resource locators, wherein the uniform resource locators specify one or more Internet addresses of the information segments which relate specifically to the content of the video and audio signals of the received programming;

a means for decoding, connected to the second means for receiving, the uniform resource locators to determine the specified Internet addresses;

a controller means, connected to the second receiving means, for interpreting the uniform resource locators;

a means, connected to the decoding means, for sending message requesets to specific Internet sites located at the Internet addresses corresponding to the uniform resource locators and consequently retrieving the one or more Internet information segments residing at the determined Internet addresses; and a display means, connected to the controller and the first and second receiving means, for presenting the video and audio signals concurrently with the Internet information segments;

whereby the Internet information segments are synchronized to the video signal and displayed at predetermined times during the program;

a means for entering information at a member broadcaster Web site, including the uniform resource locators corresponding to a particular program and a time at which the particular program will be received by the first receiving means; and a means for storing the entered information.

2. The system of claim 1, further comprising:

a means for sending the stored uniform resource locators at the time at which the particular program will be received by the first receiving means, directly over an Internet connection to the second receiving means.

3. A system for presenting integrated television programming and corresponding related Internet information segments obtained from Web sites on the Internet, the system comprising:

a television broadcaster data entry and broadcast means comprising:

a means for accessing a service Web site on the Internet, wherein a member broadcaster of television programming accesses the service Web site;

a means for entering information into the service Web site, wherein the entered information is comprised of uniform resource locators and a time at which a particular program will be broadcast by the member broadcaster, wherein the uniform resource locators specify one or more Internet addresses of the relevant Internet information pages which relate specifically to the content of the particular program being broadcast by the member broadcaster;

a means, connected to the entering means, for storing the entered information;

a first means for sending the particular program being broadcast by the member broadcaster to a user, wherein the particular program contains a video signal and an audio signal;

a second means, connected to the storing means, for sending, at the time at which the particular program will be broadcast, the stored uniform resource locators over a direct Internet connection to the user;

a user terminal comprising:

a first means for receiving, from the first sending means, the particular program, including the video and audio signals, being broadcast by the member broadcaster to a user;

a second means for receiving, from the second means for sending, the stored uniform resource locators which correspond to the video and audio signals received by the first receiving means;

a controller means, connected to the second receiving means, comprising:

a means for decoding the uniform resource locators to determine the specified Internet addresses;

a means, connected to the decoding means, for retrieving the one or more Internet information segments residing at the determined Internet addresses; and a display means, connected to the controller and the first and second receiving means, for presenting the video and audio signals concurrently with the Internet information segments.

* * * * *